(12) United States Patent
Van Doorn

(10) Patent No.: US 6,628,860 B1
(45) Date of Patent: Sep. 30, 2003

(54) FIBER OPTIC CONNECTOR SYSTEMS

(75) Inventor: Schelto Van Doorn, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 140 days.

(21) Appl. No.: 09/588,055

(22) Filed: Jun. 5, 2000

(51) Int. Cl.[7] .............................. G02B 6/26; G02B 6/42
(52) U.S. Cl. .............................. 385/31; 385/65; 385/88
(58) Field of Search .............................. 385/31, 88, 65, 385/52, 89

(56) References Cited

U.S. PATENT DOCUMENTS

| | | | |
|---|---|---|---|
| 4,135,783 A | 1/1979 | Kunze | 385/65 |
| 4,461,537 A | 7/1984 | Raymer, II et al. | 385/88 |
| 4,767,180 A | 8/1988 | Zajac et al. | 385/62 |
| 4,798,440 A | 1/1989 | Hoffer et al. | 385/89 |
| 4,808,127 A * | 2/1989 | Swanic | 439/139 |
| 4,943,136 A * | 7/1990 | Popoff | 385/46 |
| 5,325,455 A * | 6/1994 | Henson et al. | 385/89 |
| 5,333,225 A | 7/1994 | Jacobowitz et al. | 385/93 |
| 5,345,527 A * | 9/1994 | Lebby et al. | 385/114 |
| 5,355,429 A * | 10/1994 | Lee et al. | 385/136 |
| 5,371,820 A * | 12/1994 | Welbourn et al. | 385/76 |
| 5,381,498 A | 1/1995 | Bylander | 385/83 |
| 5,598,495 A | 1/1997 | Rittle et al. | 385/75 |
| 5,645,438 A * | 7/1997 | Cairns | 439/139 |
| 5,661,832 A * | 8/1997 | Yonemura | 385/88 |
| 5,685,727 A * | 11/1997 | Cairns | 439/139 |
| 5,694,506 A | 12/1997 | Kobayashi et al. | 385/60 |
| 5,734,770 A | 3/1998 | Carpenter et al. | 385/72 |
| 5,757,997 A | 5/1998 | Birrell et al. | 385/60 |
| 5,796,896 A | 8/1998 | Lee | 385/59 |
| 5,892,870 A * | 4/1999 | Fingler et al. | 385/59 |
| 6,005,991 A * | 12/1999 | Knasel | 385/14 |
| 6,250,819 B1 * | 6/2001 | Porte et al. | 385/88 |
| 6,257,771 B1 * | 7/2001 | Okayasu | 385/89 |

FOREIGN PATENT DOCUMENTS

| | | |
|---|---|---|
| WO | WO 98/34141 | 8/1998 |
| WO | WO 98/40774 | 9/1998 |

* cited by examiner

*Primary Examiner*—Lynn Feild
*Assistant Examiner*—Hae Moon Hyeon
(74) *Attorney, Agent, or Firm*—Fish & Richardson P.C.

(57) ABSTRACT

A fiber optic connector system that includes a fiber optic plug and a fiber optic socket (or input) is described. The fiber optic input includes mechanisms for mounting the fiber optic input to a printed circuit board, an optical component, and an optical fiber receiving surface. The fiber-receiving surface has two or more alignment grooves configured to receive two or more optical fibers of a multi-fiber fiber optic cable and to guide the received fibers into optical contact with the optical component. The fiber optic plug includes a body configured to hold two or more optical fibers, a cap having a front face through which the optical fibers are extendable, and a biasing member coupled between the body and cap. The fiber optic input includes an alignment rail and the plug includes a slot configured to slide along the alignment rail and thereby guide the plug into alignment with the optical fiber receiving surface. The alignment rail and the slot are configured to direct the optical fibers toward the fiber-receiving surface at an oblique angle. The front face of the plug defines a plurality of spaced-apart openings through which the optical fibers are extendable; the openings are configured to align the optical fibers with the alignment grooves of the socket.

18 Claims, 5 Drawing Sheets

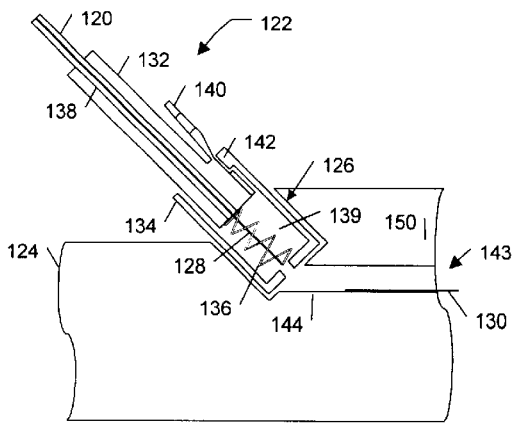
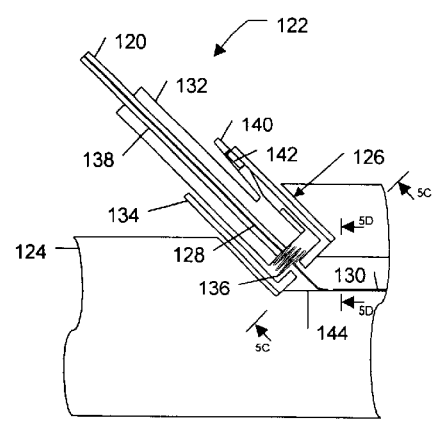
FIG. 5A
FIG. 5B
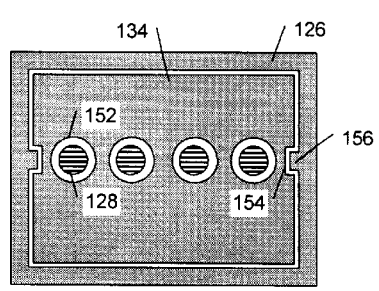
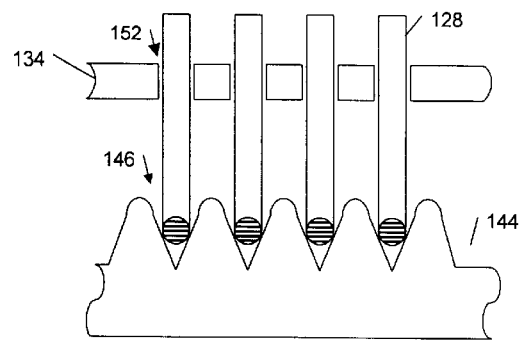
FIG. 5C
FIG. 5D

FIBER OPTIC CONNECTOR SYSTEMS

TECHNICAL FIELD

This invention relates to fiber optic connectors and optical fiber systems.

BACKGROUND

Fiber optic connectors couple optical communication channels (e.g., optical fibers) to one or more optical devices (e.g., electro-optic and opto-electric devices). The optical communication channels may be defined by a bundle of glass or plastic fibers (a "fiber optic cable"), each of which is capable of transmitting data independently of the other fibers. Relative to traditional metal connections, optical fibers have a much greater bandwidth, they are less susceptible to interference, and they are much thinner and lighter. Because of these advantageous physical and data transmission properties, efforts have been made to integrate fiber optics into computer system designs. For example, in a local area network, fiber optics may be used to connect a plurality of local computers to each other and to centralized equipment, such as servers and printers. In this arrangement, each local computer has an optical transceiver for transmitting and receiving optical information. The optical transceiver may be mounted on a printed circuit board that supports one or more integrated circuits. Typically, each computer includes several printed circuit boards that are plugged into the sockets of a common backplane. The backplane may be active (i.e., it includes logic circuitry for performing computing functions) or it may be passive (i.e., it does not include any logic circuitry). An external network fiber optic cable may be connected to the optical transceiver through a fiber optic connector that is coupled to the backplane.

Other fiber optic applications have been proposed. For example, backplanes have been designed to interconnect the circuit boards of a computer system and thereby enable optical communication between the boards (see, e.g., U.S. Pat. Nos. 4,913,508, 5,134,679, and 5,793,919). These backplanes often are referred to as "optical backplanes." Typically, an optical backplane includes one or more fiber optic cables that couple to connectors mounted on the edges of the printed circuit boards.

SUMMARY

The invention features a fiber optic connector system that enables direct-board-to board optical communication that does not require data transmission through the backplane.

In one aspect, the invention features a fiber optic input. The input includes means for mounting the fiber optic input to a printed circuit board, an optical component, and an optical fiber receiving surface. The fiber-receiving surface has two or more alignment grooves configured to receive two or more optical fibers of a multi-fiber fiber optic cable and to guide the received fibers into optical contact with the optical component.

The optical component preferably includes two or more input optical fibers each disposed in a respective alignment groove. Non-contacting portions of the input optical fibers may be oriented at an oblique angle relative to the optical fiber receiving surface. The input may include a fiber guide configured to hold the input optical fibers and to align the input optical fibers with the alignment grooves of the optical fiber receiving surface. The input optical fibers preferably are unbound to the alignment grooves in which they are disposed. The alignment grooves may be each defined by a pair of adjacent side walls with widths that taper as they extend away from the optical fiber receiving surface.

In one embodiment, the optical fiber input includes a socket configured to receive a plug of a multi-fiber fiber optical cable. The socket preferably comprises an alignment rail for guiding the plug into alignment with the optical fiber receiving surface. The alignment rail may be configured to guide the plug so that optical fibers of the multi-fiber fiber optic cable are oriented at an oblique angle relative to the optical fiber receiving surface.

In another aspect, the invention features a fiber optic plug. The plug includes a body configured to hold two or more optical fibers, a cap having a front face through which the optical fibers are extendable, and a biasing member coupled between the body and cap.

The plug body preferably has a bore configured to receive a multi-fiber fiber optic cable. The plug body preferably is configured to hold the optical fibers in a spaced-apart, substantially planar array.

In one embodiment, the front face defines a plurality of spaced-apart openings through which the optical fibers are extendable. The front face openings preferably are configured to align the optical fibers with alignment grooves in a plug socket. The fiber optic plug may include a slot configured to slide along an alignment rail in the plug socket and thereby guide the optical fibers into alignment with the alignment grooves.

The biasing member preferably comprises a spring that is configured to urge the body and cap apart.

The fiber optic plug may be characterized by a retracted configuration in which the optical fibers are contained within a cavity defined by the cap, and an extended configuration in which the optical fibers extend through the front face of the cap. The fiber optic plug may include a locking mechanism configured to lock the cap to the body in the extended configuration. The locking mechanism preferably comprises a latch secured to the body and a hub secured to the cap.

In another aspect, the invention features a fiber optic connector system that includes the above-mentioned fiber optic input and the above-mentioned fiber optic plug.

Among the advantages of the invention are the following. The invention provides fiber optic connector system that enables direct board-to-board optical communication without the complexity and possible communication delays that would be required if data transmissions had to go through the backplane. The inventive plug and socket system enable the optical fibers of a multi-fiber fiber optic cable to be readily aligned and coupled to an optical device. In addition, the inventive fiber optic connector system may be installed and removed quickly and easily. Furthermore, the invention may be retrofitted into existing computer systems without difficulty.

Other features and advantages of the invention will become apparent from the following description, including the drawings and the claims.

DESCRIPTION OF DRAWINGS

FIG. 5A is a diagrammatic cross-sectional side view of a retracted fiber optic plug positioned in a socket of an optical device.

FIG. 5B is a diagrammatic cross-sectional side view of the fiber optic plug of FIG. 5A in an extended configuration.

FIG. 5C is a cross-sectional front view of the extended fiber optic plug of FIG. 5B positioned inside the socket.

FIG. 5D is a diagrammatic cross-sectional front view of the optical device of FIG. 5B receiving the optical fibers from the extended fiber optic plug.

DETAILED DESCRIPTION

Figure 1:
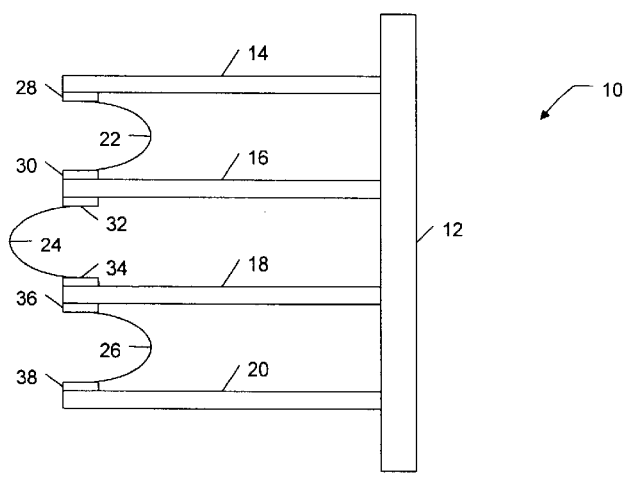
FIG. 1 is a diagrammatic side view of a computer system that includes a backplane and four printed circuit boards coupled by respective optical fiber systems.

Referring to FIG. 1, a computer system 10 includes a backplane 12 into which printed circuit boards 14, 16, 18 and 20 are plugged. Optical fiber systems 22, 24 and 26 optically couple printed circuit boards 14–20. Each of the printed circuit boards 14–20 supports one or more integrated circuits and at least one optical device 28, 30, 32, 34, 36, 38 (e.g., a fiber optic transceiver) for transmitting and receiving optical data signals over optical fiber systems 22–26. Each of the optical fiber systems 22–26 includes a fiber optic positioner that is configured to urge opposite ends of a multi-fiber fiber optic cable respectively toward a pair of opposed optical devices that are mounted on facing sides of a pair of adjacent printed circuit boards. By this arrangement, optical fiber systems 22–26 enable direct board-to-board optical communication without requiring data transmission through backplane 12.

The components (e.g., the integrated circuits and the optical devices) supported on the printed circuit boards may be housed in ball grid array (BGA) packages that include die carriers with bottom surfaces supporting a plurality of solder balls (or bumps) that connect to contacts on the surfaces of the printed circuit boards. The BGA packages may include an over molded pad array carrier or a ceramic substrate material that houses the printed circuit board components. In alternative embodiments, the printed circuit board components may be mounted to the printed circuit boards using surface mount technology (SMT) or other mounting technique (e.g., bore soldering or pin through-hole technology). In other embodiments, the integrated circuits and optical devices 28–38 may be mounted on single-sided printed circuit boards rather than two-sided printed circuit boards 14–20.

Figures 2A, 2B:
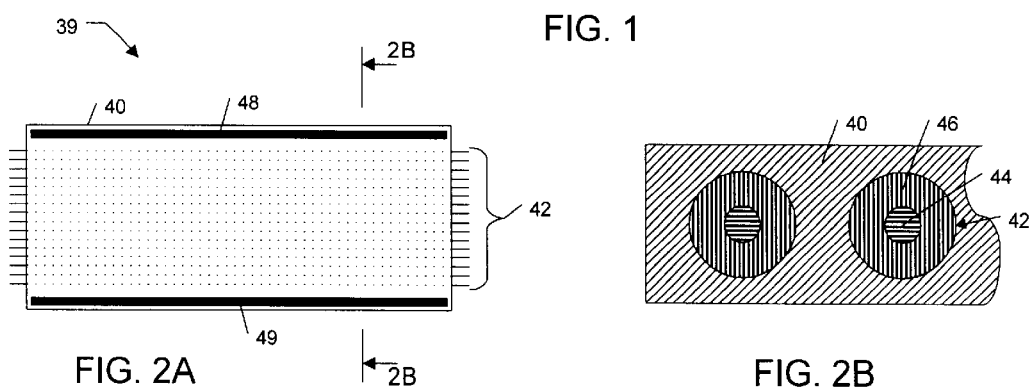
FIG. 2A is a diagrammatic top view of an optical fiber system with an integral positioner in a disengaged configuration.
FIG. 2B is a diagrammatic cross-sectional front view of the optical fiber system of FIG. 2A.
Figure 2C:
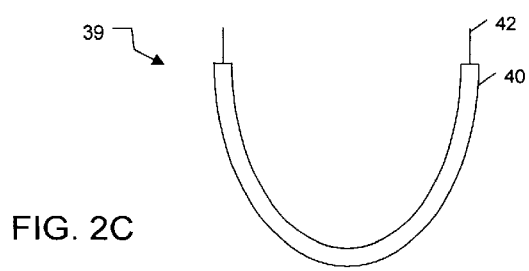
FIG. 2C is a diagrammatic side view of the optical fiber system of FIG. 2A with the positioner in an engaged configuration.

Referring to FIGS. 2A–2C, in one optical fiber system 39, a positioner 40 is a flexible and resilient ribbon matrix that may be formed from, for example, a UV curable acrylate material or other thermoplastic material (e.g., polyvinyl chloride). Positioner 40 encases and holds two or more optical fibers 42 in a spaced-apart, substantially parallel planar array. The optical fibers 42 may be spaced apart by a distance of about 100 μm to about 1,000 μm. As shown in FIG. 2B, each optical fiber 42 includes a core 44 and a cladding 46. The ends of optical fibers 42 extend beyond positioner 40 so that they may be coupled to an opposed pair of optical devices. In one embodiment, optical fibers 42 extend beyond the ends of positioner 40 by a distance of about 0.5 cm to about 3 cm. The fiber end faces may be flat or angled; if they are angled, however, optical fibers 42 should be oriented in a way that is complementary to the orientation of the input fibers of positioner 40. In this embodiment, positioner 40 and optical fibers 42 form a unitary fiber optic ribbon cable with sixteen optical communication channels. Other embodiments may include a different number of optical fibers (e.g., 2, 4, 16, 32, 64 or 128 optical fibers).

Referring to FIG. 2C, positioner 40 is sufficiently flexible that it can be bent elastically into a curved shape that enables the ends of optical fibers 42 to engage a pair of opposed optical devices. At the same time, the ribbon matrix is sufficiently resilient that it generates an outward restoring force that tends to return optical fiber system 39 back to its original planar shape (FIG. 2A). This restoring force causes positioner 40 to clamp the ends of optical fibers 42 to the optical inputs of the opposed optical devices. Additional materials may be incorporated into the ribbon matrix to increase its resiliency. For example, one or more resilient wires 48 formed from, for example, metal or plastic, may be embedded along the length of the ribbon matrix to increase the restoring force generated by positioner 40.

In operation, a technician may apply a compressive force between the ends of positioner 40 to cause it to bend into the U-shaped curve shown in FIG. 2C. Because of the elongated planar shape of the ribbon matrix, positioner 40 preferentially bends in a plane that is parallel to optical fibers 42 and orthogonal to the planar surface of the ribbon matrix. Once the ends of the ribbon matrix have been bent together close enough, the technician may insert optical fiber system 39 between a pair of opposed optical devices and, subsequently, reduce the applied compressive force until optical fiber system 39 engages the opposed optical devices. As shown in FIG. 1, the U-shaped optical fiber system 39 may be inserted between the pair of opposed optical devices so that it extends between the corresponding pair of adjacent printed circuit boards (e.g., optical fiber systems 22 and 26) or extend outside of the region between the printed circuit boards (e.g., optical fiber system 24).

Figure 3A:
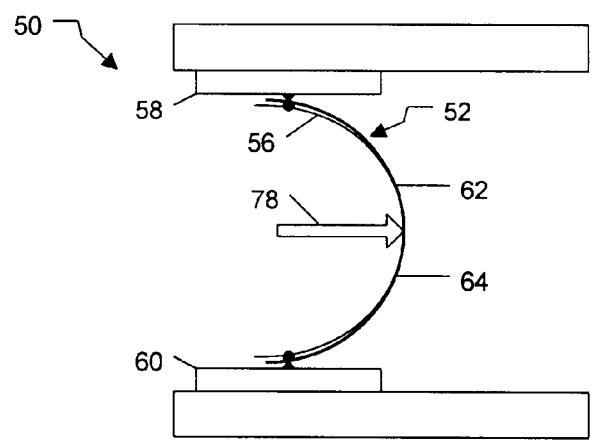
FIG. 3A is an enlarged diagrammatic side view of two printed circuit boards, an optical fiber system, and a fiber optic positioner in a disengaged configuration.
Figure 3B:
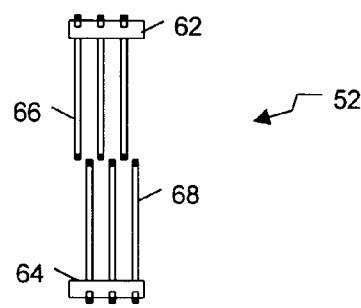
FIGS. 3B and 3C are a diagrammatic top view and an enlarged diagrammatic side view of the disengaged positioner of FIG. 3A, respectively.
Figure 3C:
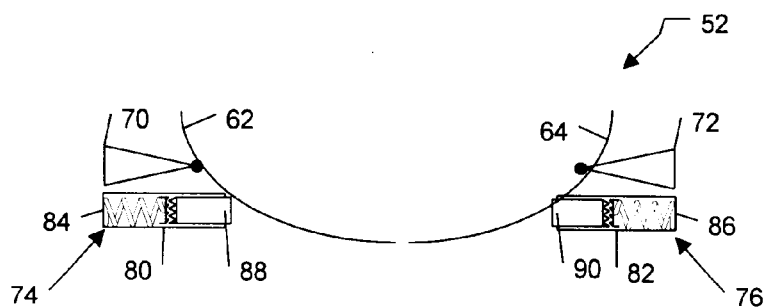
Figure 3D:
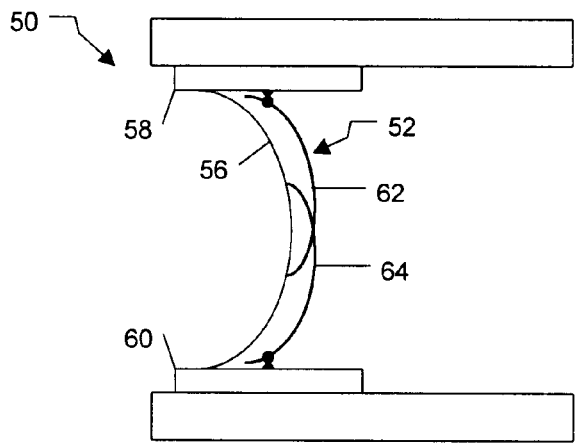
FIG. 3D is an enlarged diagrammatic side view of the two printed circuit boards coupled by the optical fiber system of FIG. 3A, with the positioner in an engaged configuration.
Figure 3E:
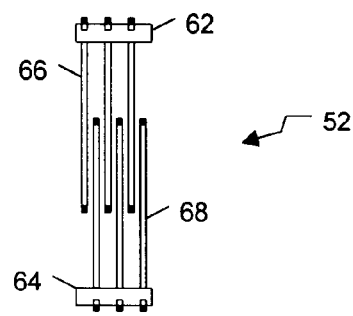
FIGS. 3E and 3F are a diagrammatic top view and an enlarged diagrammatic side view of the engaged positioner of FIG. 3D, respectively.
Figure 3F:
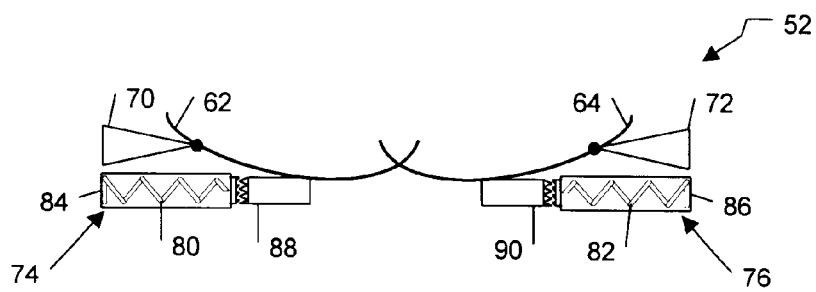

Referring to FIGS. 3A–3F, in another optical fiber system 50, a positioner 52 is configured to releasably receive a multi-fiber fiber optic ribbon cable 56 (FIG. 3A) and bias it into engagement with a pair of opposed optical devices 58 and 60 (FIG. 3D). The fibers of ribbon cable 56 extend beyond the surrounding support matrix so that they may be coupled to optical devices 58, 60. The optical fibers may extend beyond the support matrix by a distance of about 0.5 cm to about 3 cm.

Positioner 52 includes a pair of cantilevered support arms 62, 64 respectively coupled to a plurality of distal support fingers 66, 68. Support fingers 66, 68 are interleaved when positioner 52 is in the engaged configuration (FIGS. 3E and 3F) and they are almost end-to-end when positioner 52 is in the disengaged configuration (FIGS. 3B and 3C). Support fingers 66, 68 include rails (not shown) for guiding multi-fiber fiber optic cable 56 into proper alignment with optical devices 58, 60. Positioner 52 is pivotally mounted to support structures 70, 72, which are coupled to optical devices 58, 60. Dual-position pistons 74, 76 are mounted to optical devices 58, 60 and are operable to switch positioner 52 between the engaged configuration and the disengaged configuration upon application of a pressing force 78 to a central portion of positioner 52. Pistons 74, 76 include springs 80, 82 respectively coupled between cylindrical housings 84, 86 and caps 88, 90. Each piston 74, 76 operates, for example, like a convention ballpoint pen, and includes a locking mechanism that causes caps 88, 90 to engage inner surfaces of housings 84, 86 every other time a sufficient pressing force 78 is applied.

In operation, a technician may set positioner 52 into the disengaged configuration and load multi-fiber fiber optic ribbon cable 56 onto positioner 52 (FIG. 3A). At this time, caps 88, 90 are locked, springs 80, 82 are compressed within housings 84, 86 and support arms 62, 64 are locked in the disengaged configuration. After the ribbon cable has been seated properly on positioner 52, the technician may apply a simple pressing force 78 to a centralized portion of the positioner to connect the ribbon cable to optical devices 58, 60. In response to the pressing force, caps 88, 90 unlock and the restoring forces of springs 80, 82 bias support arms 62, 64 into the engaged configuration.

In each of the above-described embodiments, the fiber optic positioners are configured to urge opposite ends of a multi-fiber fiber optic cable respectively toward a pair of opposed optical devices. As explained in detail below, the fiber optic positioners also are configured to guide a multi-fiber fiber optic cable into proper alignment with the pair of opposed optical devices.

Figure 4A:
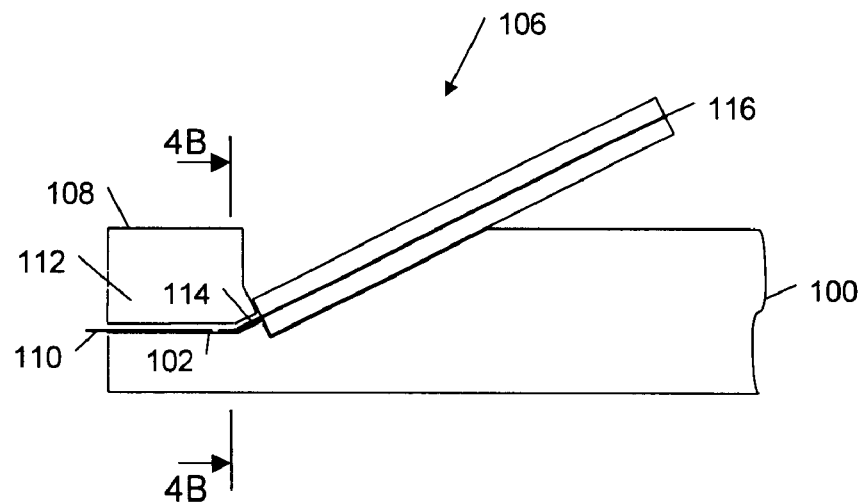
FIG. 4A is a diagrammatic cross-sectional side view of an optical device with a plurality of grooves receiving the fibers of a multi-fiber fiber optic cable.
Figure 4B:
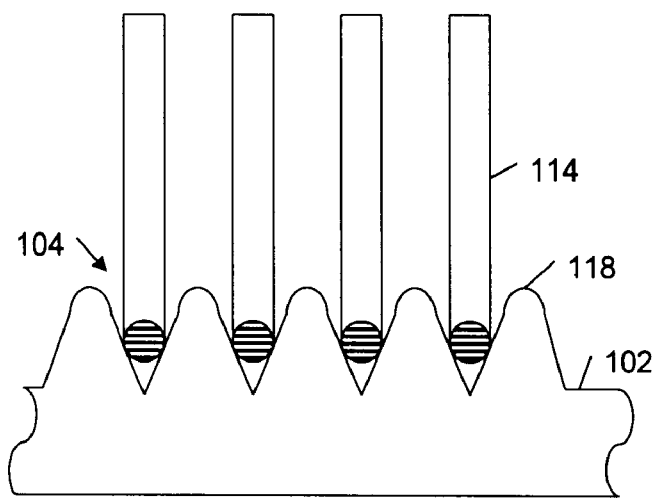
FIG. 4B is a diagrammatic cross-sectional front view of the optical device of FIG. 4A receiving the fibers of the multi-fiber fiber optic cable.

Referring to FIGS. 4A and 4B, in one embodiment, an optical device 100 includes a fiber-supporting surface 102 with a plurality of fiber-receiving grooves 104 and an optical input 106 formed from a fiber guide 108 and a plurality of input optical fibers 110. Fiber guide 108 and fiber-supporting surface 102 may be formed in the over molded pad array carrier (or the ceramic substrate material) that houses optical device 100. Fiber guide 108 has a plurality of bores 112 that retain input fibers 110 and align them with grooves 104. Input fibers 110 may be secured in bores 112 by, for example, an adhesive. In this embodiment, input fibers 110 are substantially straight. In another embodiment, input fibers 110 may be oriented at an oblique angle relative to fiber-supporting surface 102 and, as a result, input fibers 110 would bend or bow resiliently in the regions where they contact fiber-supporting surface 102. In the engaged configuration, one of the above-described positioners aligns and guides the coupling fibers 114 of the multi-fiber fiber optic cable 116 into grooves 104 at an oblique angle relative to fiber-supporting surface 102 (FIG. 4A). Coupling fibers 114 resiliently bend or bow in the regions where they contact fiber-supporting surface 102. In the engaged configuration, the distal ends of coupling fibers 114 abut the distal ends of input fibers 110 to optically couple the multi-fiber fiber optic cable 116 to optical device 100. By this arrangement, slight differences in the lengths of the coupling fibers 114 may be accommodated by changes in the locations where input fibers 110 bend at fiber-supporting surface 102. In an alternative embodiment, coupling fibers 114 may abut directly against an active optical device positioned in bore 112.

In this embodiment, grooves 104 are defined by pairs of adjacent side walls 118 that taper in width as they extend away from surface 102. To accommodate an optical fiber spacing of about 250 μm, side walls 118 may have a base width of about 125 μm and a groove width at surface 102 of about 125 μm.

Referring to FIGS. 5A–5D, in another embodiment, the terminal portion of a multi-fiber fiber optic cable 120 includes a fiber-aligning plug 122, and the over molded pad array carrier (or the ceramic substrate material) that houses an optical device 124 incorporates a mating socket 126. Socket 126 is configured to receive plug 122 and to align and guide the coupling fibers 128 of fiber optic cable 120 into optical contact with the input fibers 130 of optical device 124.

Plug 122 includes a plug body 132, a plug cap 134 which is slidable within plug body 132, and a spring 136 that is coupled between plug body 132 and plug cap 134. Plug body 132 includes a bore 138 through which optical fiber cable 120 extends. Fiber optic cable 120 may be secured within bore 138 by, for example, an adhesive. The distal portions of coupling fibers 128 extend beyond the distal end of plug body 132 and into a cavity 139 defined by plug cap 134. Plug 122 is characterized by a retracted configuration in which the distal portions of coupling fibers 128 are contained in plug cap 134 (FIG. 5A), and an extended configuration in which the distal portions of coupling fibers 128 extend beyond plug cap 134 (FIG. 5B). Plug body 132 includes a latch 140 that catches on a lug 142 of plug cap 134 to lock plug 122 in the extended configuration; latch 140 may be depressed to release plug cap 134 from plug body 132, whereby spring 136 biases plug cap 134 away from plug body 132. Plug 122 and socket 126 also may include a similar locking mechanism (not shown) to secure plug 122 to socket 126.

Plug socket 126 includes a fiber guide 143 and a fiber-supporting surface 144 with a plurality of fiber-receiving grooves 146. Fiber guide 143 and fiber-supporting surface 144 may be formed in the over molded pad array carrier (or the ceramic substrate material) that houses optical device 124. Fiber guide 143 has a plurality of bores 150 that hold input fibers 130 and align them with grooves 146. Input fibers 130 may be secured in bores 150 by, for example, an adhesive. In this embodiment, input fibers 130 are substantially straight. In another embodiment, input fibers 130 may be oriented at an oblique angle relative to fiber-supporting surface 144 and, as a result, input fibers 130 would bend or bow resiliently in the regions where they contact fiber-supporting surface 144.

As shown in FIG. 5C, plug cap 134 includes a plurality of fiber-aligning openings 152 through which coupling fibers 128 extend when plug 122 is in the extended configuration. Plug cap 134 also includes a pair of slots 154 that ride along a pair of alignment rails 156 formed in socket 126. Plug 122 may be inserted within socket 126 and locked in the extended configuration by compressing spring 136 until latch 140 catches lug 142. In this position, coupling fibers 128 extend out of openings 152 in plug cap 134 toward fiber supporting socket surface 144. As shown in FIG. 5D, openings 152 align and guide coupling fibers 128 into grooves 146. Coupling fibers 128 are oriented at an oblique angle relative to fiber-supporting surface 144 and, as a result, coupling fibers 128 resiliently bend or bow in the regions where they contact fiber-supporting surface 144. The distal ends of coupling fibers 128 abut the distal ends of input fibers 130 to optically couple multi-fiber fiber optic cable 120 to optical device 124. By this arrangement, slight differences in the lengths of the coupling fibers 128 may be accommodated by changes in the locations where input fibers 130 bend at fiber-supporting surface 144. In an alternative embodiment, coupling fibers 114 may abut directly against an active optical device positioned in bore 150.

Other embodiments are within the scope of the claims.

For example, the optical fiber receiving surfaces described above are configured to bend the received fibers at only one plane. As a result, the optical fibers form a "C-shape" near the region of contact between the optical fibers and the optical fiber receiving surface. In other embodiments, the optical fibers may be bent at two planes so that the optical fibers form an "S-shape."

The optical fibers also may be arranged in any of the above-described embodiments as a spaced-apart, three-dimensional array of substantially parallel fibers.

What is claimed is:

1. A fiber optic input, comprising:
   means for mounting the fiber optic input to a printed circuit board;
   an optical component; and
   an optical fiber receiving surface having two or more alignment grooves configured to receive two or more optical fibers that are oriented at an angle relative to the grooves, and to guide the received fibers into optical contact with the optical component; and
   a fiber guide configured to direct the optical fibers toward the fiber receiving surface at an angle.

2. The optical fiber input of claim 1, wherein the optical component includes two or more input optical fibers each disposed in a respective alignment groove.

3. The optical fiber input of claim 2, wherein non-contacting portions of the input optical fibers are oriented at an oblique angle relative to the optical fiber receiving surface.

4. The optical fiber input of claim 2, wherein the input optical fibers are unbound to the alignment grooves in which they are disposed.

5. The optical fiber input of claim 1, further comprising a socket configured to receive a plug of the multi-fiber fiber optical cable.

6. The optical fiber input of claim 5, wherein the socket comprises an alignment rail for guiding the plug into alignment with the optical fiber receiving surface, and the plug comprises a slot configured to slide along the alignment rail.

7. The optical fiber input of claim 6, wherein the alignment rail is configured to guide the plug so that optical fibers of the multi-fiber fiber optic cable are oriented at an oblique angle relative to the optical fiber receiving surface.

8. A fiber optic input, comprising:
   means for mounting the fiber optic input to a printed circuit board;
   an optical component;
   an optical fiber receiving surface having two or more alignment grooves configured to receive two or more optical fibers that are oriented at an angle relative to the grooves, and to guide the received fibers into optical contact with the optical component; and
   a fiber guide configured to direct the optical fibers toward the fiber receiving surface at an angle,
   wherein the alignment grooves are each defined by a pair of adjacent side walls with widths that taper as they extend away from the optical fiber receiving surface.

9. A fiber optic plug, comprising:
   a body configured to hold two or more optical fibers;
   a cap having a front face through which the optical fibers are extendable;
   a biasing member coupled between the body and cap;
   wherein the plug is characterized by a retracted configuration in which the optical fibers are contained within a cavity defined by the cap, and an extended configuration in which the optical fibers extend through openings on the front face of the cap; and
   the plug further comprises a locking mechanism configured to lock the cap to the body in the extended configuration.

10. The fiber optic plug of claim 9,
    wherein the locking mechanism comprises a latch secured to the body and a lug secured to the cap.

11. A fiber optic connector system, comprising:
    a fiber optic plug comprising a body configured to hold two or more optical fibers, a cap having a front face through which the optical fibers are extendable, and a biasing member coupled between the body and cap; and
    a fiber optic socket comprising means for mounting the fiber optic socket to a printed circuit board, an optical component, an optical fiber receiving surface having two or more alignment grooves configured to receive the two or more optical fibers and to guide the received fibers into optical contact with the optical component, and a fiber guide configured to direct the optical fibers toward the fiber receiving surface at an angle.

12. The fiber optic connector system of claim 11, wherein the fiber guide includes an alignment rail and the plug includes a slot configured to slide along the alignment rail and thereby guide the plug into alignment with the optical fiber receiving surface.

13. The fiber optic connector system of claim 12, wherein the alignment rail and the slot are configured to direct the optical fibers toward the fiber-receiving surface at an oblique angle.

14. The fiber optic connector system of claim 12, wherein the front face of the plug defines a plurality of spaced-apart openings through which the optical fibers are extendable, the openings being configured to align the optical fibers with the alignment grooves of the socket.

15. A method comprising:
    mounting a fiber optic input to a printed circuit board, the fiber optic input including an optical component and an optical fiber receiving surface having two or more alignment grooves configured to guide optical fibers into optical contact with the optical component;
    extending the optical fibers toward the receiving surface such that the length of the optical fibers is at an angle relative to the receiving surface when the optical fibers first contact the receiving surface; and
    continuing to the extend the optical fibers toward the optical component such that as more of the optical fiber contacts the receiving surface, the optical fiber bends so that the portion contacting the receiving surface is parallel to the receiving surface and the portion not yet contacting the receiving surface is still at an angle relative to the receiving surface.

16. The method of claim 15, wherein continuing to extend the optical fibers toward the optical component includes fitting the optical fibers into the alignment grooves and extending the optical fibers along the alignment grooves toward the optical component.

17. A fiber optic input, comprising:
    an optical fiber receiving surface having a first and second opposing ends;

input fibers located at the first end of the optical fiber receiving surface;

alignment grooves extending from the first end of the receiving surface to the second end of the receiving surface, the alignment grooves configured to receive optical fibers at the second end of the receiving surface and guide the optical fibers along the length of the receiving surface into optical contact with the input fibers; and an open volume located at the second end of the receiving surface, the open volume providing enough open space through which the optical fibers can pass to contact the second end of the receiving surface at an angle and extend into the alignment grooves.

18. The input of claim 17 further comprising an alignment structure to hold the optical fibers at the angle.

* * * * *